(12) United States Patent
Fox et al.

(10) Patent No.: US 8,512,854 B2
(45) Date of Patent: Aug. 20, 2013

(54) COMPOSITE MATERIAL, METHOD OF MAKING AND ARTICLES FORMED THEREBY

(75) Inventors: Richard B. Fox, Smithfield, RI (US); Daniel M. Wyner, North Scituate, RI (US); Jack Waksman, South Easton, MA (US); James E. Gaudet, Blackstone, MA (US)

(73) Assignee: Polyworks, Inc., North Smithfield, RI (US)

( * ) Notice: Subject to any disclaimer, the term of this patent is extended or adjusted under 35 U.S.C. 154(b) by 153 days.

(21) Appl. No.: 12/325,725

(22) Filed: Dec. 1, 2008

(65) Prior Publication Data

US 2009/0142551 A1    Jun. 4, 2009

Related U.S. Application Data

(60) Provisional application No. 60/991,007, filed on Nov. 29, 2007.

(51) Int. Cl.
*B32B 3/26* (2006.01)
*A47C 17/00* (2006.01)

(52) U.S. Cl.
USPC ............... 428/316.6; 428/308.6; 428/319.3; 428/319.7; 5/691

(58) Field of Classification Search
USPC .......... 428/316.6, 306.6, 308.4, 319.3, 319.7; 5/691
See application file for complete search history.

(56) References Cited

U.S. PATENT DOCUMENTS

| | | | |
|---|---|---|---|
| 4,794,658 A * | 1/1989 | Goodale | 5/737 |
| 5,701,623 A | 12/1997 | May | |
| 6,643,875 B2 | 11/2003 | Boso et al. | |
| 6,922,862 B1 | 8/2005 | Thompson | |
| 7,424,760 B2 | 9/2008 | Chaffee | |
| 2001/0029632 A1* | 10/2001 | Parvin | 5/727 |
| 2006/0277950 A1* | 12/2006 | Rock | 66/169 R |
| 2007/0199155 A1* | 8/2007 | Thygsen | 5/737 |
| 2009/0029147 A1* | 1/2009 | Tang et al. | 428/319.1 |
| 2010/0005595 A1* | 1/2010 | Gladney et al. | 5/691 |

* cited by examiner

*Primary Examiner* — Hai Vo
(74) *Attorney, Agent, or Firm* — Whiteford, Taylor & Preston LLP

(57) ABSTRACT

A composite material, method of making and articles formed thereby. The composite material can comprise a gel-infused foam material.

16 Claims, 4 Drawing Sheets

COMPOSITE MATERIAL, METHOD OF MAKING AND ARTICLES FORMED THEREBY

RELATED CASES

This application claims the benefit of U.S. Provisional Patent Application No. 60/991,007 filed on Nov. 29, 2007, which is incorporated herein by reference in its entirety.

TECHNICAL FIELD

The present disclosure relates to a layered cushioning material and, in particular, to a composite cushioning material.

BACKGROUND

The marketplace is replete with products that attempt to provide comfort and support to existing support structures by, for example, including a layer of foam disposed on or incorporated into the support structure. For example, mattress and pillow toppers are often used to provide additional comfort and to extend the useful life of a mattress or pillow. Such toppers are disposed at the top surface of the mattress or pillow, and may consist of a cushioned material thinner than the mattress and coextensive with the length and width of the mattress or pillow. The cushioning material may be foam, feather, fiberfill, and the like, and combinations of the foregoing. The thickness of the topper can be selected based on the amount of support and cushioning desired by a user. The topper provides additional cushioning on the mattress or pillow, and protects the mattress or pillow from soiling.

Depending on the material of construction, many mattresses and pillows have poor heat dissipation, which is uncomfortable for the user when sleeping. As a result, some support structures include ventilation holes, extra layers of material, adjustable air bladders and the like, to attempt to improve heat dissipation.

SUMMARY

Disclosed herein, in one embodiment, is a composite material comprising a layer of open-cell foam material comprising an upper surface; a layer of gel-infused foam material disposed adjacent to the open-cell foam material; and a barrier layer disposed adjacent to the gel-infused foam material, opposite the open-cell foam material.

Another embodiment is directed to a method of making a composite material, comprising: providing a layer of foam material; forming a gel-infused foam material by disposing a gel precursor material onto the foam material, such that at least a portion of the gel precursor material at least partially penetrates the foam material; disposing a barrier layer onto the gel precursor material; and allowing the gel precursor material to cure.

DRAWINGS

Advantages, novel features, and uses of the disclosure will become more apparent from the following detailed description of non-limiting embodiments of the disclosure when considered in conjunction with the accompanying drawings, which are schematic and are not drawn to scale. In the figures, each identical or substantially similar component that is illustrated in various figures is typically represented by a single numeral or notation. For purposes of clarity, not every component is labeled in every figure, nor is every component of each embodiment of the disclosure shown where illustration is not necessary to allow those of ordinary skill in the art to understand the disclosure. In the drawings:

DETAILED DESCRIPTION

The present disclosure is directed to a composite material (hereinafter "composite material"), a method of making the composite material and articles formed thereby. "Composite material," as used herein, means a first material that at least partially penetrates a second material; the first and second material can be the same or different materials.

One exemplary composite material can comprise a polymeric gel material that at least partially penetrates an open-cell foam material. For ease of illustration, the present composite materials may be referred to hereinafter as "gel-infused materials" or "gel-infused composite materials," but it should be understood that the disclosure is not limited to any particular type of material.

Figure 1:
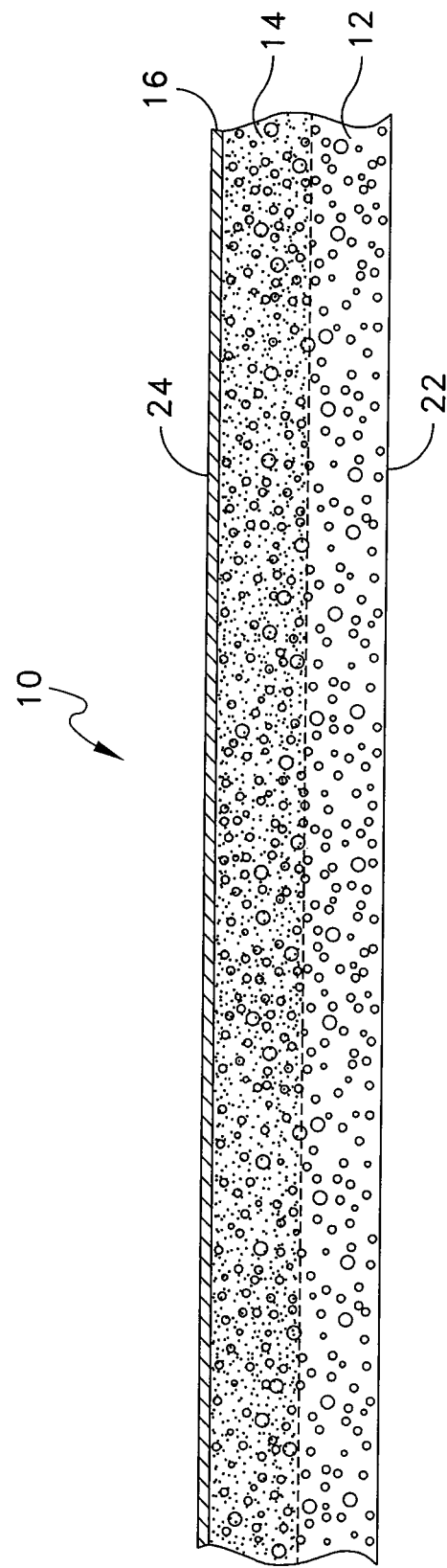
FIG. 1 shows a cross-sectional side view of a section of an exemplary composite material according to the present disclosure.

FIG. 1 shows a cross-sectional view of a section of one embodiment of an exemplary composite material 10 according to the present disclosure, comprising opposing upper and lower surfaces 24, 22. Composite material 10 can comprise a foam layer 12, a gel-infused foam layer 14 disposed adjacent to the foam layer 12, and a barrier layer 16 disposed adjacent to the gel-infused foam layer 14 opposite the foam layer 12.

Figure 2:
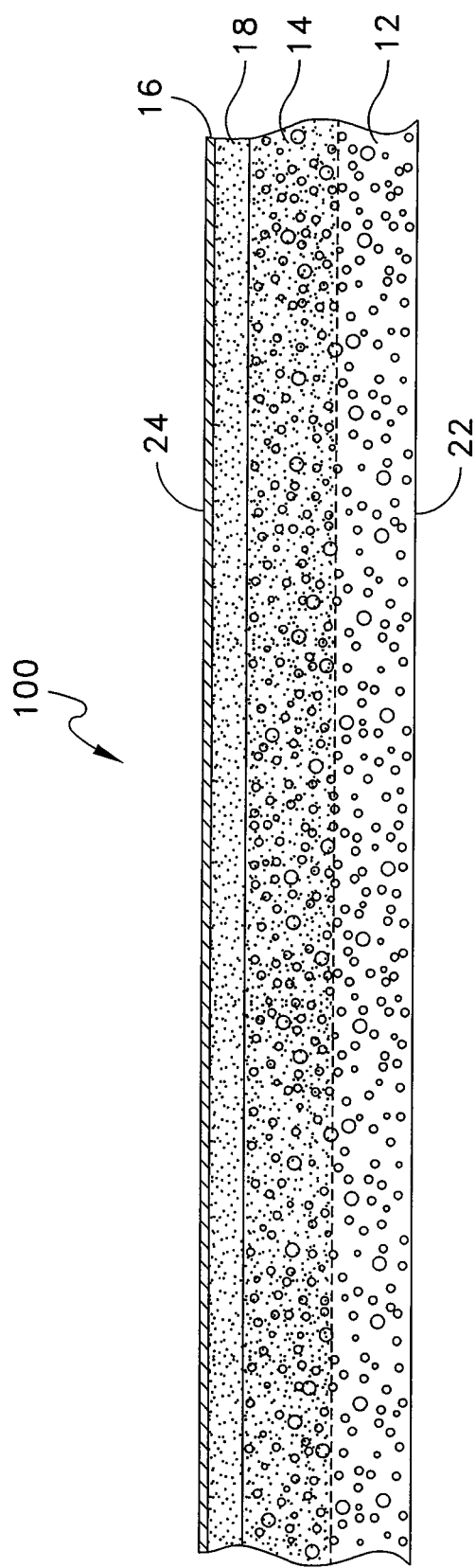
FIG. 2 shows a cross-sectional side view of a section of another exemplary composite material according to the present disclosure.

FIG. 2 shows a cross-sectional view of a section of another embodiment of an exemplary composite material 100 according to the present disclosure, also comprising opposing upper and lower surfaces 24, 22. Composite material 100 comprises a foam layer 12; a gel-infused foam layer 14 disposed adjacent to the foam layer 12; a gel layer 18 disposed adjacent to the gel-infused foam layer 14 and opposite the foam layer 12; and a barrier layer 16 disposed adjacent to the gel-infused foam layer 14 and opposite the foam layer 12.

Figure 3:
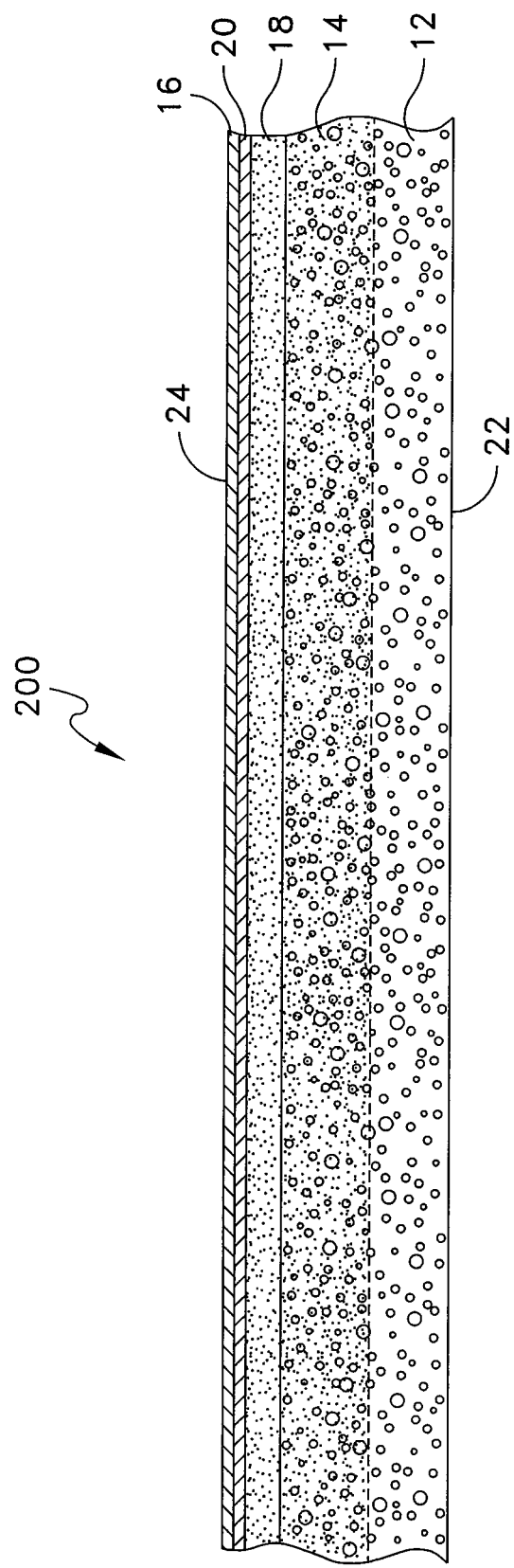
FIG. 3 shows a cross-sectional side view of a section of another exemplary composite material according to the present disclosure.

In some embodiments, an optional material layer 20 can be disposed in and/or between any of the foregoing layers, which can comprise color, text and/or graphics, indicia such as labels, embossing, and the like. For example, FIG. 3 shows a cross-sectional view of a section of another exemplary embodiment of a composite material 200 according to the present disclosure, also comprising opposing upper and lower surfaces 24, 22. Composite material 200 comprises a foam layer 12; a gel-infused foam layer 14 disposed adjacent to the foam layer 12; a gel layer 18 disposed adjacent to the gel-infused foam layer 14 and opposite the foam layer 12; a layer 20 disposed adjacent to the gel layer 18 and opposite the foam layer 12; and a barrier layer 16 disposed adjacent to the layer 20 and opposite the foam layer 12.

Figure 4:
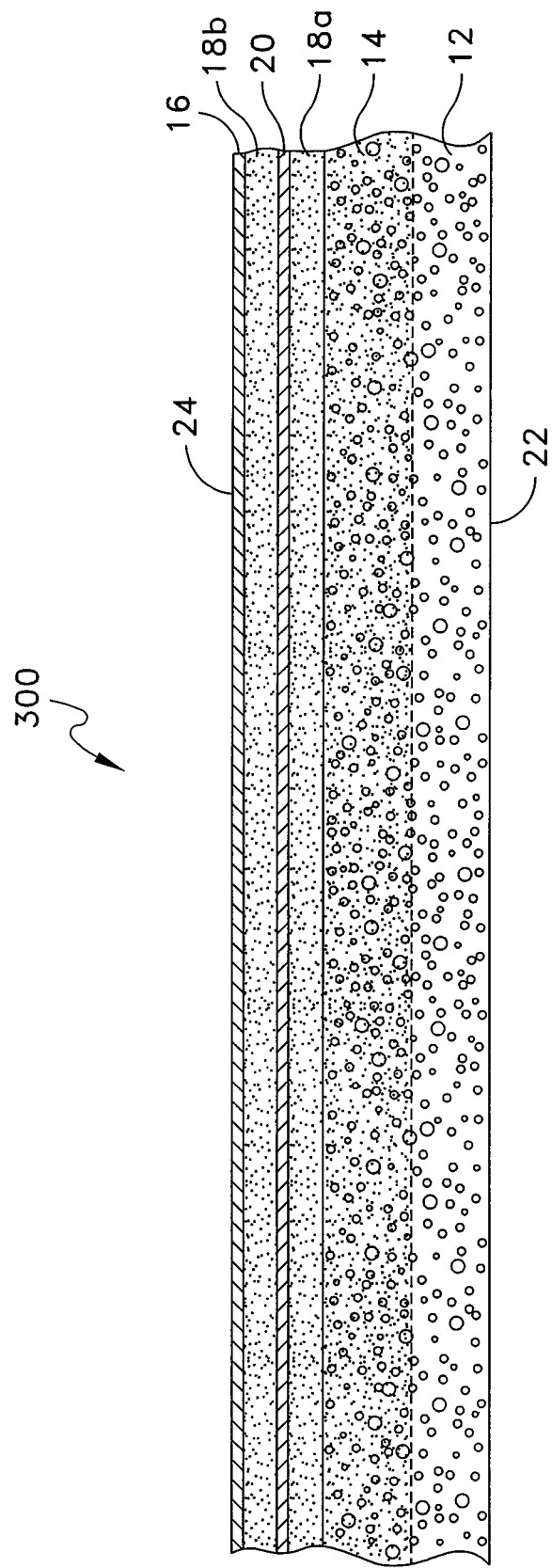
FIG. 4 shows a cross-sectional side view of a section of another exemplary composite material according to the present disclosure.

FIG. 4 shows a cross-sectional view of a section of another exemplary embodiment of a composite material 300 according to the present disclosure, also comprising opposing upper and lower surfaces 24, 22. Composite material 300 comprises a foam layer 12; a gel-infused foam layer 14 disposed adjacent to the foam layer 12; a first gel layer 18a disposed adjacent to the gel-infused foam layer 14 and opposite the foam layer 12; an optional layer 20 disposed adjacent to the gel layer 18a and opposite the foam layer 12; a second gel layer 18b disposed adjacent to layer 20 and opposite the foam layer 12; and a barrier layer 16 disposed adjacent to the second gel layer 18b and opposite the foam layer 12.

The foregoing composite materials 10, 100, 200, 300 can facilitate the manufacture of a variety of products that can be desirable for aesthetics and/or to minimize wear and/or friction. The composite materials and methods can be used to form articles and/or regions of articles, comprising any size, thickness or geometry. The size, thickness, geometry, softness, and adhesive strength of the articles and/or portions of the articles can be selected to optimize the conditions for which they are designed. In addition, the present composite materials can be used to replace gel and/or foam in any type of product. When used instead of gels, the present composite materials are more pleasant to touch. In addition, the present composite materials weigh less than comparable products comprising only gel as well as foam products that are completely infused with gel.

Some exemplary embodiments of articles in which the composite materials can be used include, but are not limited to, padding for medical devices and equipment (e.g., wheelchair seat pads, wheelchair padding, medical pads, hospital gurney pads, operating table pads, positioning pads); padding for furniture (e.g., upholstery padding, furniture cushions, furniture pads); padding for athletic equipment and devices (e.g., athletic cushions, sports and athletic padding, gymnastic mats); padding for recreational equipment and devices (e.g., camping and sleeping mats); padding for apparel (e.g., bra straps, shoulder pads, shoe linings, boot linings); padding for household goods (e.g., anti-fatigue mats, mattress pads, mattress covers, mattress "toppers," the pillow-top portion of pillow-top mattresses, pillows, and the like); padding accessories (e.g., briefcase shoulder straps, computer carrying cases, purses, gloves, and the like); pet beds; and the like.

The method of making the composite materials 10, 100, 200, 300 can comprise disposing a first portion of a gel precursor (not illustrated) onto a surface of foam layer 12. Dispensing the gel precursor can comprise pouring an amount (e.g., volume, weight and/or thickness) of gel precursor sufficient to penetrate the foam layer 12 to a desired depth, which may vary depending upon the product and/or application. "Gel precursor," as used herein, means a fluid material that has not yet cured to form a gel. For example, the gel precursor can comprise a precursor to a viscoelastic polymeric material. It should be understood that the method is not limited to polymeric materials, and that materials other than polymeric materials used (e.g., composite materials, and the like). For ease of illustration, the gel material referred to hereinafter is a polymeric gel material.

For practical purposes, due to the weight of the gel materials, it can be useful to minimize the depth of penetration of the gel precursor into the foam while balancing the desired characteristics of the final product, e.g., softness, total weight, and the like. For example, for products such as mattress toppers, it can be desirable to minimize the overall weight of the topper. Therefore, tailoring the depth of penetration of the gel precursor into the foam layer can provide the desired softness, while minimizing the contribution of the gel to the overall weight of the topper. For example, it can be desirable for a mattress topper to comprise a gel-infused layer of about 1/16 inch to about 1/8 inch, and such a depth can be achieved by applying about 1-1.1 gram of gel precursor per square inch to the upper surface of the foam layer 12, which provides a gel infused layer 14 of about 1/16 inch. Disposing the gel precursor onto the foam layer 12 can be performed manually, or the process can be automated. For example, the gel precursor can be disposed onto the foam layer 12 using a variety of techniques such as, but not limited to, a roller, pouring, spraying, and/or the like.

After disposing the gel precursor onto the foam layer 12, it can be allowed to form a gel by curing for a predetermined period of time (e.g., about 10 seconds to about 10 minutes). If desired, it is possible to vary the speed of curing by varying one or more factors such as, for example, pressure, temperature, catalyst concentration (when used), and/or the like. If desired, the polymerization rate of the gel precursor can be increased by using elevated pressure and/or temperature. In addition, it can be desirable in some instances to assist formation of the composite material by applying a vacuum to the material (e.g., to lower surface 22 of foam layer 12).

In some instances, it can be desirable for the composite material to comprise a layer of gel disposed adjacent to the gel-infused foam material, which can be formed by disposing additional gel precursor onto the cured gel-infused foam material 12. Alternatively, a layer of gel material can be formed by disposing an excess of gel precursor onto the foam material, such that the gel precursor begins to cure before all of the gel precursor has penetrated into the foam material.

A barrier layer 16 can be disposed over the gel precursor before or during curing the gel precursor. The barrier layer 16 can be disposed as a sheet of material or as a coating of material, for example, by painting, spraying, brushing manually, rolling, padding, scrapping and/or the like. Disposing the barrier layer 16 onto the gel precursor can be performed manually, with a tool such as a roller, or the process can be automated. When the process is automated, the barrier layer can comprise registration guides (e.g., holes, perforation, etc., and the like) to aid in its alignment to the foam layer 12 and to any intermediate and/or subsequent layers. Disposing the barrier layer 16 onto the gel precursor can comprise disposing a portion of the barrier layer 16 onto a portion of the gel precursor such that an interface exists between the gel precursor and the barrier layer 16. The remaining portion of the barrier layer 16 can be advanced onto the remaining portion of the gel precursor by applying pressure to the barrier layer 16 behind the interface, and advancing the interface until the barrier layer covers the entire gel precursor layer. The application of pressure while advancing the barrier layer substantially minimizes the formation of air bubbles between the gel precursor and the barrier layer. The final composite material 10, 100, 200, 300 can be cut into a desired shape by, for example, die cutting through the foregoing layers.

As noted above, if desired, an optional material layer 20 can be disposed in the composite material. Layer 20 can be disposed over the gel precursor or over the gel-infused foam 12 before or during curing the gel precursor. The optional material layer 20 can be disposed as a sheet of material in the same manner described above with respect to the barrier layer.

If desired, the gel layer can be embossed prior to curing by stamping, rolling, and the like, an embossed surface over the at least partially cured gel precursor.

In some instances, it may be desirable to be able to adhere composite material 10, 100, 200, 300 to various surfaces. For example, with reference to FIGS. 1-4, an optional adhesive can be disposed on lower surface 22, and the adhesive can be supported by a release and/or support layer (not illustrated). Some possible adhesives can comprise pressure sensitive adhesives, thermoplastic adhesives, and the like, as well as combinations comprising at least one of the foregoing. One example of such a material is available from 3M as product number 7026.

In some instances, it may be desirable to be able to adhere the upper and/or lower surface of composite material 10, 100, 200, 300 to various surfaces. For example, optionally, an adhesive (not illustrated) may be disposed on one or more lower surface 22 and/or a surface of layers 14, 18, 18a, 18b and/or 20. If necessary, the adhesive can be supported by a release and/or support layer (not illustrated).

In some instances, the gel and/or gel infused layer may comprise sufficient adhesive strength to be adhered to a surface in the absence of a separate adhesive. In such instances, the barrier layer 16 may be replaced with a release and/or support layer (not illustrated). Optionally, the release and/or support layer can comprise a release coating, such as silicone, which can assist in the manual release of the barrier layer 16 from an underlying layer.

In all of the foregoing, some possible adhesives can comprise pressure sensitive adhesives, thermoplastic adhesives, and the like, as well as combinations comprising at least one of the foregoing. One example of such a material is available from 3M as product number 7026.

A variety of materials can be used in the foregoing methods to make the foregoing composite materials. Foam layer 12 can comprise any material capable of being infused with another material (for example, capable of being infused with a polymeric gel material). Examples of suitable materials that can be used for the foam layer include, but are not limited to, open-cell foamed plastic materials, non-wovens, mesh materials (such as metal mesh, plastic mesh, and the like), spacer fabric, and combinations comprising at least one of the foregoing. Examples of open-cell foamed plastic materials include, but are not limited to, shape memory foam, polyurethane foam, latex foam, and the like, and combinations comprising at least one of the foregoing. Specific examples of polyurethane foams include, but are not limited to, polyester and polyether polyurethane foam, and combinations comprising at least one of the foregoing. One example of a shape-memory foam is manufactured under the name TEMPUR-PEDIC®. The foam material can comprise any thickness, density and/or cell size, depending upon the application for which it is intended. For example, when open-cell foam is used as a foam material in any one of composite materials 10, 100, 200, 300, and subsequently formed into a mattress topper, the open-cell foam thickness can be about two (2) inches, and the density can comprise about 1.5 to about 3 pounds (lbs.). In addition, the thickness, density and/or cell size can be varied within the material. For example, the open-cell foam can comprise a thickness varying from about 1½ to about 2½ inches, but it should be understood that any thickness may be used, including about ⅛ inch to about ⅜ inch.

The gel layer 18 can comprise, for example, any material comprising sufficient structural integrity to be formed into predetermined shapes, including polymeric materials and foam polymeric materials; and that is capable of withstanding the environment in which it is intended to be used, without substantial degradation. The hardness of the material (e.g., the gel materials) can be selected to provide articles and/or regions of articles with a predetermined hardness, which can be tailored for specific cushioning and/or wear resistance applications. For example, gel 18 can comprise a durometer ranging from about 5 Shore 000 to about 88 Shore D. The hardness of the gel can be determined using a tool such as a durometer.

Examples of suitable polymeric materials for the gel include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials. Examples of other materials include, but are not limited to, composite materials, frothed foams, and the like.

Formation of the gel precursor can take place by a variety of methods known to those of skill in the art. For example, formation of a polyurethane gel can comprise reacting suitable pre-polymeric precursor materials e.g., reacting a polyol and an isocyanate in the presence of a catalyst.

In some embodiments, it can be desirable for the gel to have sufficient softness and/or pliability to provide comfort against a body. In such instances, gel can comprise a durometer ranging from about 0.01 Shore 00 to less than or equal to about 70 Shore A, more particularly less than 70 Shore 00, more particularly still less than 60 Shore 00.

Optional layer 20 can comprise a variety of synthetic and/or non-synthetic materials including, but not limited to, paper, fabric, plastic film, and/or the like, as well as composites and/or combinations comprising at least one of the foregoing. When layer 20 comprises a fabric layer, the fabric can be knit, woven, non-woven, synthetic, non-synthetic, and combinations comprising at least one of the foregoing. Disposing a fabric layer as layer 20 can be advantageous because it can trap and disperse air bubbles that may otherwise form in or between the layers, resulting in a better appearance for the final molded products 19. Layer 20 also can comprise color, embossing, graphics and/or indicia, including text. The color, graphics and/or indicia disposed on layer 20 can be transmitted through other layers when they are formed from colorless and/or transparent materials, which can be desirable for aesthetic and cost reasons. In addition, if desired, layer 20 can be fluid-permeable. "Fluid-permeable," as used herein, means that the material from which layer 20 is formed is open to passage or entrance of a fluid material, such as the gel precursor, sometimes resulting in the formation of a gel layer adjacent to layer 20, in the absence of a separate "pour" of the gel precursor.

The barrier layer 16 can comprise any material capable of providing sufficient elasticity to prevent tearing and/or stretching when a force is applied thereto; sufficient structural integrity to be formed into predetermined shapes; and that is capable of withstanding the environment in which it is intended to be used, without substantial degradation. In addition, in some embodiments, it can be desirable for the barrier layer to be capable of providing at least some moisture transmission in order to minimize or prevent the local build-up of moisture. The barrier layer 16 also can be selected to facilitate the handling of the gel layer, which can comprise adhesive characteristics in some instances. Therefore, the barrier layer 16 can be selected to comprise a relatively non-tacky surface and a relatively smooth feel to the human touch. The barrier layer 16 can comprise an elongation of about 25 percent (%) to about 1500%, more particularly about 200% to about 1000%, and more particularly still about 300% to about 700%. It should be understood that the modifier "about" used in connection with a quantity is inclusive of the stated value and has the meaning dictated by the context (e.g., includes the degree of error associated with measurement of the particular quantity). Some possible materials for the barrier layer 16 include polyolefins, polystyrenes, PVC, latex rubber, and thermoplastic elastomers (TPEs), and/or the like, and combinations comprising at least one of the foregoing materials. Some possible TPE materials include polyurethane, silicone, and/or the like, and combinations comprising at least one of the foregoing materials. Examples of materials that are suitable for the barrier layer include, but are not limited to, Vacuflex, Hytrel and PEBAX, and the like.

Barrier layer 16 can comprise any thickness. For practical purposes it has been found that thinner layers can provide improved hand-feel, while thicker layers can provide increased durability. Therefore, it can be desirable to use the thinnest barrier layer possible in order to prevent punctures in the barrier layer 16. When the gel 18 is tacky, puncturing the barrier layer 16 can expose the underlying tacky material of the gel, making it difficult to handle. Barrier layer 16 can comprise a thickness ranging from about 0.2 milli-inch (hereinafter "mil") to about 5 mil, more particularly from about 0.5 mil to about 3 mil, and more particularly still from about 0.75 mil to about 2 mil. It should be understood that thicker or thinner materials may be used, depending upon the application for which the material is intended. For example, when the composite material 10, 100, 200, 300 is used to make a mattress topper and/or the pillow portion of a pillow-top mattress, the amount of support provided by the composite material can be varied by varying the thickness of, among other things, the barrier layer 16.

As noted above, barrier layer 16 can be applied as a sheet of material. In the form of a sheet, and especially when the barrier layer is relatively thin, the barrier material can be very flexible and may wrinkle and/or fold very easily during handling. Therefore, if desired, the barrier layer 16 also can comprise a support layer (not illustrated), which assists in handling the material. If the barrier layer 16 comprises such a supporting layer, then the barrier layer 16 can be disposed such that the support layer is opposite the foam layer 12.

One or more of the foregoing layers can comprise one or more additives such as, but not limited to, modifiers, coloring agents, stabilizers, phase changing materials, ultraviolet inhibitors, and/or active agents as well as combinations comprising at least one of the foregoing. The concentration of the additive can be varied depending on the desired characteristics of the composite material and/or the layer. Suitable active agents can comprise tolnaftate, undecenoic acid, allylamines, chlorine, copper, baking soda, sodium omadine, zinc omadine, azoles, silver, and/or the like, and combinations comprising at least one of the foregoing. For example, silver can provide an antifungal/antibacterial effect. For purposes of economy and effectiveness, it has been found advantageous to include active agents, when used, in the barrier layer 16. Because the barrier layer 16 is relatively thin in comparison to the gel 18, disposing such agents in the barrier layer 16 allows the use of reduced total amounts of the agents to achieve similar effective concentrations in comparison to thicker layers, thereby reducing costs associated with the additives. Also, disposing such agents in the barrier layer 16 ensures that the agents are disposed in the outermost layer of the article i.e., the body contacting regions, rather than in regions remote from the user, which can increase the effectiveness of the agents. One possible phase changing material can comprise phase changing microspheres (available under the product name Outlast), which contain materials that can change phases at near body temperature. As a result, heat energy can be stored in the barrier layer, resulting in a product that can feel cool or warm. In one illustrative embodiment, the barrier layer 16 can comprise an active agent such as silver, to minimize or prevent the formation of fungus, bacteria and/or parasites. One possible barrier layer 16 comprising such an active agent is Vacuflex 18411AG, available from Omniflex, Inc. Such an active agent can be desirable in products such as mattresses, as discussed above.

In any of the foregoing embodiments, the use of a colored or patterned layer 20 (e.g., a colored and/or patterned fabric layer) in combination with a transparent gel can provide what appears to be a colored or patterned gel article. This can create an article with much more color variations than would be possible with simply using colored or pigmented gel. The use of patterned fabrics or metallic sheen fabrics or other variations in the aesthetic of layer 20 can impart these aesthetics to the gel article; such aesthetics would be difficult or impossible to impart to the gel article by pigmenting the gel or printing the gel article. This process also offers a potential economic advantage to coloring or printing the gel.

Gels having relatively low durometers, such as viscoelastic gels, can be extremely tacky, making them difficult or impossible to use in commercial process techniques. Thus, applications for relatively low durometer gel materials have been limited, despite their advantageous pliability and softness characteristics.

The present methods and materials can provide the following advantages: 1) the composite materials do not have "shape memory," therefore they do not retain shapes (e.g., when used in a mattress, the composite materials will not sag over time); 2) the use of active agents in the composite materials can minimize or prevent formation of fungus, bacteria and parasites, etc.; 3) the use of the barrier layer provides a barrier to fungus, bacteria and parasites, etc.; 4) the upper surface of the composite material is cool to the touch, at least initially, especially when barrier layer comprises a material such as Outlast™; 5) decreased material costs in comparison to pads made entirely of gel; 6) lighter weight than comparable gel pads; 7) the combination of gel and open cell foam provide a pleasant "gel-like" feel, with a less expensive method; 8) the ability to create a relatively thin gel layer, which is less heavy and less expensive than gel layers of comparable thickness; 9) the composite materials have a springy (lighter) feel in comparison to gel layers; 10) the layers of the present composite material interact such that the final product has a less layered feel i.e., the layers are better integrated in comparison to a layer of gel disposed over a layer of foam (i.e., without the gel being infused into the foam); 11) the composite material provides the support associated with gel pads, but with a fraction of the add-on weight of gel; 12) the present composite materials provide an antimicrobial/anti-odor feature, which is beneficial in applications in sports equipment, furniture and mattress pads; and 13) the composite materials provide a substantially waterproof surface that cane be very useful in, for example, products where incontinence is an issue (e.g., mattress pads, wheelchair pads, and the like).

While the disclosure has been described with reference to an exemplary embodiment, it will be understood by those skilled in the art that various changes may be made and equivalents may be substituted for elements thereof without departing from the scope of the disclosure. For example, although described herein with reference to foamed materials, in particular plastic or polymeric foamed materials, it should be understood that the method can be applied to other materials capable of being infused with another material such as, but not limited to, wovens, non-wovens, metal mesh, and the like. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cushioning article, comprising:
   a layer of open-cell foam material comprising an upper surface and a first thickness;
   a layer of gel-infused foam material in direct contact with the upper surface of said layer of open-cell foam material, said layer of gel-infused foam material comprising an upper surface and having a second thickness, the gel-infused foam layer comprising a polymeric gel material infused into the open-cell foam material, extending from the upper surface of the layer of open-cell foam material to a pre-determined depth from the upper surface of the layer of open-cell foam material; and
   a barrier layer disposed adjacent to the upper surface of the gel-infused foam layer, opposite the layer of open-cell foam material;
   a first material layer different from the gel material and the barrier layer, disposed between the upper surface of the layer of gel-infused foam material and the barrier layer;
   a first gel layer disposed between the upper surface of the layer of gel-infused foam material and the first material layer; and
   a second gel layer disposed between the first material layer and the barrier layer;
   wherein the upper surfaces of the open-cell foam layer and the gel-infused foam layer are coplanar, and the second thickness of the layer of gel-infused foam material is less than the first thickness of the layer of open-cell foam material.

2. A cushioning article according to claim 1, wherein the foam is a plastic foam.

3. A cushioning article according claim 1, wherein the foam is selected from the group consisting of polyurethane foam, latex foam, and combinations of at least one of the foregoing.

4. A cushioning article according claim 1, wherein the barrier layer is a thermoplastic elastomer (TPE).

5. A cushioning article according claim 1, wherein the barrier layer is a thermoplastic polyurethane (TPU).

6. A cushioning article according claim 1, wherein the barrier layer comprises an elongation of at least about 100 percent.

7. A cushioning article according claim 1, wherein the barrier layer has a thickness of less than about 5 milli-inches.

8. A cushioning article according claim 1, wherein the barrier layer comprises a moisture transmittable material.

9. A cushioning article according claim 1, wherein the barrier layer comprises a phase changing material.

10. A cushioning article according claim 1, wherein the polymeric gel material infused into the open-cell foam material is transparent.

11. A cushioning article according claim 1, wherein the barrier layer comprises an active agent.

12. A cushioning article according to claim 11, wherein the active agent is selected from the group consisting of an antimicrobial active agent, an antifungal agent, and combinations of at least one of the foregoing.

13. A cushioning article according claim 1, wherein the depth of the polymeric gel material infused into the open-cell foam material is about 1/16 inch.

14. A cushioning article according to claim 1, wherein the depth of the polymeric gel material infused into the open-cell foam material is about 1/8 inch.

15. A cushioning article according to claim 1, wherein the layer of gel-infused foam material and the layer of open-cell foam are coextensive.

16. A cushioning article comprising:
    a layer of open-cell foam material comprising an upper surface and a first thickness;
    a layer of gel-infused foam material in direct contact with the upper surface of said layer of open-cell foam material, said layer of gel-infused foam material comprising an upper surface and having a second thickness, the gel-infused foam layer comprising a polymeric gel material infused into the open-cell foam material, extending from the upper surface of the layer of open-cell foam material to a pre-determined depth from the upper surface of the layer of open-cell foam material; and
    a barrier layer disposed adjacent to the upper surface of the gel-infused foam layer, opposite the layer of open-cell foam material,
    wherein the upper surfaces of the open-cell foam layer and the gel-infused foam layer are coplanar, and the second thickness of the layer of gel-infused foam material is less than the first thickness of the layer of open-cell foam material; and
    wherein the layer of gel-infused foam material and the layer of open-cell foam are coextensive.

* * * * *